PEN — POLYETHYLENE NAPHTHALENE-2,6-DICARBOXYLATE
PET — POLYETHYLENE TEREPHTHALATE

United States Patent Office 3,616,832
Patented Nov. 2, 1971

3,616,832
RUBBER ARTICLES REINFORCED WITH FILAMENTS
Takeo Shima, Seiichi Yamashiro, Masao Yoshimura, and Takatoshi Kuratsuji, Iwakuni-shi, Iwao Fujimoto, Wakimachi, and Yukio Kato and Kenji Maeda, Iwakuni-shi, Japan, assignors to Teijin Limited, Osaka, Japan
Filed Dec. 22, 1969, Ser. No. 887,237
Claims priority, application Japan, Dec. 24, 1968, 43/95,173; Nov. 15, 1969, 44/91,686
Int. Cl. B60c 9/20; C08g 17/06
U.S. Cl. 152—361   8 Claims

ABSTRACT OF THE DISCLOSURE

A rubber article, especially a tyre and a belt, reinforced with the filaments of a substantially linear polyester consisting essentially of ethylene naphthalene-2,6-dicarboxylate recurring units and having an intrinsic viscosity of at least 0.5 and a concentration of carboxyl groups of less than 60 equivalents per million grams of the polymer.

---

This invention relates to rubber articles reinforced with filaments, and more particularly to rubber articles such as tyres and belts reinforced with the filaments of ethylene naphthalene-2,6-dicarboxylate polyester.

In recent years, rubber tyres have been subjected to increasingly severe operating conditions because of the higher speeds and weights of automobiles and other vehicles and higher landing speeds and weights of airplanes. Transmission belts, conveyors and the like rubber articles for use in conveying and power transmission have also tended to be operated under heavier loads at higher speeds. For this reason, fibrous structures for reinforcing these rubber articles should have such characteristics as high Young's modulus, high tenacity, resistance to hydrolysis, resistance to heat, and dimensional stability.

Tyres as a typical example of the reinforced rubber article necessitate stability and must ensure safe driving and give riding comfort during driving at high speeds. In an attempt to meet such a need, radial tyres and belted bias tyres have been developed, and are used in automobiles to some extent. The radial tyre has a carcass with cords aligned in radial directions about the rotating axis and a reinforcing belt disposed at the breaker position of an ordinary tyre in a direction approximately at right angles to the cords of the carcass, i.e., the rotating direction of the tyre. Radial tyres having such a structure possess a very high cornering power, and therefore have higher running stability, road gripping characteristics and operability during high speed driving than ordinary tyres. The belted bias tyres have the same structure except that the cords in the carcass are aligned in directions biased from the longitudinal direction. These tyres have the same characteristics as the radial tyres (U.S. Pat. 3,244,213).

In the above-described radial tyres and belted bias tyres (both of these tyres will be referred to as belted tyres hereinbelow), the reinforcing belt serves principally to inhibit the growth of a tyre during running and to retain the form of the tyre. This belt material requires not only high strength, but also high Young's modulus sufficient to endure the pneumatic pressure of the tyre and a centrifugal force owing to a high speed of rotation and to inhibit the growth of the tyre effectively.

The belted tyres advantageously possess stability during high speed driving and give riding comfort, and therefore, reduction in performance of the tyre during high speed driving should be avoided as much as possible. Generation of much heat occurs in tyres during high speed driving, and results in deterioration of dynamical characteristics of the reinforcing belt and rubber and also in chemical degradation. In view of this, inhibition of heat generation owing to deformation of tyres and improvement of resistance to heat are absolutely necessary to ensure safety against higher speeds of automobiles and other vehicles.

Belt materials consisting of rayon are used in commercially available belted tyres. As, however, these materials have lower tenacity than fibers from such polymers as nylon 6, nylon 66 and polyethylene terephthalate and suffer from drastic vulcanization deterioration in the presence of moisture and fatal reduction in strength owing to wet heat degradation caused by generation of heat during running with water coming in from the scars and cracks of tyres. It is therefore desired to employ materials free from these defects.

On the other hand, tyres having steel cords and glass fibers as the belt material have been produced on a trial basis. Although the steel cords and glass fibers have an outstandingly high Young's modulus and are ideal materials in view of the heat-generating properties, resistance to heat and wet heat degradation, they can be made into belts only through complicated processes, and lend themselves to extremely difficult handling in the production of tyres in comparison with the organic fibers described above. In addition, belts made from such steel cords and glass fibers have poor durability on bad roads and easily burst when subjected to local loads or impact. These are very serious defects against safety.

Synthetic fibers from such polymers as nylon 6, nylon 66 and polyethylene terephthalate which have hitherto been used as tyre reinforcing materials are unsuitable for use as belt materials because of very low Young's modulus and insufficient resistance to heat.

In an attempt to get over these difficulties of synthetic fiber reinforcing materials, U.S. patent specification No. 3,051,212 proposed the use of fibers of polyethylene terephthalate having a reduced concentration of free carboxyl groups as reinforcing materials for rubber articles. It may be possible that such polyester fibers have improved resistance to heat, but they cannot be basically free from a tendency to lose strength under severe operating conditions of rubber articles reinforced with them. In addition, an extreme reduction of a concentration of free carboxyl groups results in the loss of affinity with adhesives such as epoxy resins and an insufficient bonding with rubber.

An object of the present invention is to provide rubber articles reinforced with a fibrous reinforcing material having a combination of excellent Young's modulus, tenacity, dimensional stability and resistance to heat.

Another object of the invention is to provide a tyre which is excellent in stability, operability and durability during high speed driving and gives good riding comfort.

Still another object of the invention is to provide belts reinforced with fibrous reinforcing materials for use in transmitting power and conveying articles, which are excellent in Young's modulus, dimensional stability, resistance to wet heat, hysteresis loss and creep characteristics during operation under high speeds and heavy loads.

The above-mentioned objects can be achieved in accordance with the present invention by reinforcing rubber with a fibrous structure prepared from the filaments of a substantially linear polyester consisting essentially of ethylene naphthalene-2,6-dicarboxylate recurring units and having an intrinsic viscosity of at least 0.5 and a concentration of carboxyl groups of less than 60 equivalents per million grams of the polymer.

We have found that filaments of ethylene naphthalene-2,6-dicarboxylate polyester having the abovementioned properties are excellent in physical properties such as Young's modulus and tenacity and chemical properties such as resistance to hydrolysis even at high temperatures with little hysteresis loss under repeated loads, and therefore very suitable as reinforcing materials for rubber articles.

The term substantially linear "ethylene naphthalene-2,6-dicarboxylate polyester" will be used to include polyethylene naphthalates in which at least 95 mol percent of the recurring units consists of ethylene naphthalene-2,6-dicarboxylate and also copolymerized naphthalate polyesters. In general, these naphthalate polyesters are prepared by polycondensing 2,6-naphthalenedicarboxylic acids or their functional derivatives such as lower alkyl esters with ethylene glycol or its functional derivatives such as ethylene oxide and ethylene carbonate in the presence of a catalyst until the intrinsic viscosity of the polymer reaches at least 0.5. Before completion of the preparation of such polyethylene naphthalate, less than 5 mol percent, based on the recurring units of the polyester, of at least one suitable copolymerizable component may be added to form copolymerized polyesters.

The copolyester component includes compounds having two ester-forming functional groups: (a) dibasic organic acids for example, aliphatic dicarboxylic acids such as oxalic acid, succinic acid, adipic acid and sebacic acid; aliyclic dicarboxylic acids such as cyclopropanedicarboxylic acid, cyclobutanedicarboxylic acid and hexahydroterephthalic acid; aromatic dicarboxylic acids such as orthophthalic acid, isophthalic acid, terephthalic acid, naphthalene-2,7-dicarboxylic acid, naphthalene-1,4-dicarboxylic acid, naphthalene-1,5-dicarboxylic acid, and diphenyldicarboxylic acid; other dicarboxylic acids such as diphenylether dicarboxylic acid, diphenyl sulfone dicarboxylic acid, diphenoxyethane dicarboxylic acid, and sodium 3,5-dicarboxybenzenesulfonate; (b) oxycarboxylic acids such as glycolic acid, p-oxybenzoic acid and p-oxyethoxybenzoic acid; and (c) diols, for instance, oxy compounds such as propylene glycol, trimethylene glycol, diethylene glycol, tetramethylene glycol, hexamethylene glycol, neopentylene glycol, p-xylene glycol, 1,4-cyclohexane dimethanol, 2,2-bishydroxyphenyl propane, p,p'-dihydroxyphenylsulfone, 1,4-bis($\beta$ - hydroxyethoxy)benzene, 2,2-bis(p-$\beta$-hydroxyethoxyphenyl) propane, and p-phenylene bis(dimethylonyl cyclohexane), and their functional derivatives. These dicarboxylic acids, oxycarboxylic acids, diols or their functional derivatives may be added as monomers or highly polymerized compounds derived from these copolyester components in accordance with known means.

For the purpose of adjusting the molecular weight of the polymer, compounds having one ester-forming functional groups, such as naphthoic acid, benzoyl benzoic acid, and benzyloxybenzoic acid can be used as the copolyester component. It is also possible to use compounds having three or more ester-forming functional groups, such as glycerine, pentaerythritol and trimethylol propane, can also be used so long as the resulting polymer is substantially linear.

Furthermore, delustrant such as titanium dioxide and stabilizers such as phosphoric acid, phosphorous acid and esters thereof can be incorporated into the polyester employed in the present invention.

The ethylene naphthalene-2,6-dicarboxylate polyesters used in the present invention are readily prepared by a melt-polymerization method comprising maintaining a monomeric mixture consisting of naphthalene-2,6-dicarboxylic acid or its functional derivative and ethylene glycol or a pre-condensate of such mixture in a molten state and removing volatile by-products such as water and alcohol or ethylene glycol out of the system by distillation, thereby increasing the degree of polymerization of the resulting polymer. For obtaining a high polymer having an intrinsic viscosity of at least 0.5, the polymerization need be continued at high temperatures for relatively long periods of time, and this tends to result in an increased concentration of terminal carboxyl groups of the polymer.

For obtaining the ethylene naphthalene-2,6-dicarboxylate polyester used in the present invention by the melt-polymerization method, therefore, such a compound as diphenyl carbonate and diphenyl oxalate is added to the polymerization system, as described in British patent specification 1,074,204, and U.S. patent specification 3,433,770. By so doing, it is possible to obtain a polyester having a high degree of polymerization and a concentration of free carboxyl groups of less than 60 equivalents per million grams of the polymer.

Alternatively, as is well known, it is possible to synthesize polyesters with high degrees of polymerization and relatively low carboxyl group contents by forming ethylene naphthalene-2,6-dicarboxylate polyester having a medium degree of polymerization by the melt-polymerization method and polymerizing the obtained polyester in a solid phase.

Another way of reducing a concentration of free carboxyl groups to the range specified in the present invention is to treat ethylene naphthalene-2,6-dicarboxylate polyester obtained by a known method in chip or filament form with an epoxy compound such as epoxidized glycerol and vinyl cyclohexane dioxide or diazomethane.

It is important that the filament of ethylene naphthalene-2,6-dicarboxylate polyester used in the present invention should have an intrinsic viscosity of at least 0.5. Filaments having an intrinsic viscosity of less than 0.5 have a low tenacity as rubber reinforcing fibrous materials and rubber articles reinforced with such filaments are not sufficiently durable. It is desirable that the filaments of the present invention should have an intrinsic viscosity of 0.50 to 0.95.

The term "intrinsic viscosity" is defined as the limit of the fraction $$\frac{\ln(r)}{c}$$

as $c$, the concentration of the polymer solution, approaches $o$, where $r$ is the relative viscosity which is measured at several dfferent concentrations in a 6:4 mixed solvent of phenol and ortho-dichlorobenzene at 35° C.

It is particularly important that the filaments of ethylene naphthalene-2,6-dicarboxylate polyesters used in the present invention should have a concentration of carboxyl groups of less than 60 equivalents per million grams of the polymer.

The term "free carboxyl groups" will be used to include both the unionized acid group —COOH and the ionized group —COO-. The determination of the concentration of carboxyl groups is made in accordance with the procedure described in A. Conix, Makromolecular Chemie, 26, 226 (1958), and the concentration is expressed in equivalents per million grams. Polyesters having a concentration of carboxyl groups in excess of 60 equivalents per million grams of the polymer are bad in thermal resistance, and have a small tenacity retention at high temperatures.

Generally, it is preferable that the filaments used in the present invention should have a carboxyl group concentration within the range of 15 to 55 equivalents per million grams of the polymer. Lower concentrations results in a drastic reduction in adhesiveness of the filaments with rubber. As hereinbelow described, heat deterioration and loss of strength of the ethylene terephthalate polyester used as a rubber reinforcing material can be reduced only when the polyester has a carboxyl group concentration of less than 15 equivalents per million grams of the polymer. In view of this, it is quite unexpected that the filaments of ethylene naphthalate-2,6-dicarboxylate polyester used in the present invention undergo heat degradation and loss of strength to a lesser degree than ethylene terephthalate polyesters even when it has a higher carboxyl group concentration.

It is particularly preferable that the filament of the ethylene napthalene-2,6-dicarboxylate polyester used in the invention should have a Z value, expressed by the following equation, of at least 36, especially at least 40

$$Z = 200\Delta n - 3.60S - 0.118Tm - 0.007(L-50)^2 + 0.134TmS - (20 \pm 1) \quad (I)$$

wherein $\Delta n$ is a birefringence of the filament,
S is a sonic orientation,
$Tm$ is a melting point (° C.) at a constant length, and
L is a size of a crystal in A.

The birefringence is a parameter showing the degree of orientation of the molecules in the filament, and is determined by the retardation technique using bromonaphthalene as a dipping liquid and a Berek Compensator (see Modern Textile Microscopy, page 270, Emmott and Company, Limited).

The sonic orientation is determined by a pulse propagation viscoelastometer DDV-5 (product of Toyo Sokki, Japan) using a 10 cm. specimen under a load of 0.2 g./de. at a number of vibration of 10 kc. A detailed description of the measurement is given by W. H. Charch and W. W. Meseley in Tex. Res. J., vol. 24, No. 7, page 525, 1959. In this measurement, the sonic modulus of an unoriented specimen is assumed to be 56.4 g./de.

The melting point ($Tm$) at a constant length is defined as a temperature of a melting peak measured under the following conditions. Seven milligrams of a specimen is fixed to 60 mg. of a stainless steel frame to maintain the length of the specimen constant. The frame is then put into an aluminium pan together with 40 mg. of silver powder. The measurement is made by means of a Perkin Elmer DSC I type measuring instrument while heating at a rate of 10° C. per minute.

The crystal size L is a value obtained in accordance with the following P. Scherrer's equation, which represents the size of a crystal in a direction approximately at right angles to the fiber axis.

P. Scherrer's Equation $$L(A) = \frac{\lambda K}{(B-b)\cos\theta}$$

wherein

B is a (0/0) diffraction peak width in radian unit when the diffraction intensity is $(It + Iam)/2$, in which $It$ is a diffraction intensity at (0/0) peak position, and $Iam$ is a meridional X-ray diffraction intensity at $2\theta = 15.6°$ (see Chemicky Prumysl roc 17/42 (1967), cis 2);
$b$ is 0.00204 radian;
K is 0.94, and
$\lambda$ is 1.542.

Instrument used: Geiger Flex D–9C (Rigaku Denki Co., Ltd.)

Measurement conditions:

35 kv, 20 ma., CuKaNi-filtered radiation,
Divergence slit—0.15 mm.
Scattering slit—1°
Receiving slit—0.4 mm.

We have found that the Z value derived from the Equation I given hereinabove with the birefringence, sonic orientation, melting point at a constant length and crystal size employed as parameters is closely related to the dynamical characteristics of the filament of the ethylene naphthalene-2,6-dicarboxylate polyester, and constitutes a factor which greatly dominates the dynamical characteristics of reinforced rubber articles.

The preferable range of the Z value varies somewhat with the rubber articles to be reinforced with the above-mentioned filament. For instance, it a tyre is reinforced with a filament of the polyester having a Z value of at least 40, preferably at least 43, the obtained tyre has good operability (cornering power), durability, resistance to abrasion at the tread and large maximum speed. If, on the other hand, the tyre is reinforced with an ethylene naphthalene-2,6-dicarboxylate polyester filament having a Z value less than 40, it tends to be deformed at the treated part and have a reduced abrasion resistance and cornering power. When belts for transmitting power and conveying articles are reinforced with the ethylene naphthalene-2,6-dicarboxylate polyester filament having a Z value of 36 or more, the resulting belts have high durability and low tenacity loss.

It is especially preferable that the filament of the ethylene naphthalene-2,6-dicarboxylate polyester used in the present invention has a B value, expressed by the following equation, of not more than 0.65.

$$B = \frac{1}{(\rho - 1.32)L} \quad (II)$$

wherein $\rho$ is a specific gravity, and L is a size of the crystal in A.

The crystal size can be determined in accordance with the procedure described above.

The specific gravity ($\rho$) is determined by using a mixture of tetrachloromethane and n-heptane at various ratios according to the floating method, and correcting the obtained value with the specific gravity of water at 20° C.

We have found that the B value derived from the Equation II on the basis of the crystal size and specific gravity parameters are related to the dimensional stability and heat resistance of the filament, and that rubber articles reinforced with a fibrous structure consisting of a filament having the B value less than 0.65 undergo only a small growth during use and only a small shrinkage during fabrication, and are therefore excellent in uniformity. By using the filament of ethylene naphthalene-2,6-dicarboxylate polyester having a B value of not more than 0.65, especially not more than 0.55, a reinforced rubber article excellent in dimensional stability and heat resistance is obtained.

Generally, in the synthetic fibers, the Young's modulus and shrinkage are contradictory properties, and when the Young's modulus is high, the shrinkage tends to be larger. Nevertheless, the filament of ethylene naphthalene-2,6-dicarboxylate polyester used in the invention has a very scarce tendency to shrink in spite of a very high Young's modulus it exhibits. By using the filament which satisfies the above-described B value, it is possible to vulcanize rubber articles at high temperatures without causing any substantial shrinkage or degradation and prevent a permanent deformation during use of the product.

Thus, according to the preferred embodiment of the present invention, a rubber reinforcing structure having very excellent Young's modulus, dimensional stability, resistance to wet heat, hysteresis loss and creep properties can be obtained by using the filaments of the ethylene naphthalene-2,6-dicarboxylate polyester having the above-mentioned Z and B values.

The filament of the ethylene naphthalene-2,6-dicarboxylate polyester used in the present invention is produced in the following manner. An ethylene naphthalene-2,6-dicarboxylate polyester having an intrinsic viscosity larger than 0.5 is melt-spun into filaments from a spinneret maintained at a temperature higher than the melting point of the polymer. A known heat grip-type spinning machine or extruder-type spinning machine can be used, but in any case, the spinning temperature need be made higher than is necessary in the spinning of polyethylene terephthalate or nylon. Generally, it is preferable to use a spinneret temperature of 300 to 330° C. For preventing heat decomposition of the extruded polymer, the spinneret may be directly heated. During spinning, the ambient temperature of the spun filament is maintained at 250–600° C. in all or part of a region 100 cm. below the spinneret, and the spun filament is solidified thereby to form an undrawn filament having a birefringence of 0.001 to 0.020.

Preferably, the undrawn filament is then drawn so that it will satisfy the Z and B values as described above. The drawing methods and conditions are not specifically limited so long as the final filament satisfies the above-described Z and B values. The drawing is conducted between two pairs of rolls having different peripheral speeds using a pin or plate in accordance with a dry heating such as infrared heating, electric heating and high-frequency heating. Instead of the dry heating method, a wet heat drawing can also be carried out using steam or an organic liquid medium. Preferably, the drawing temperature is not lower than 110° C., and the draw ratio is not less than 5.5.

The spun filament may also be drawn after having been wound up on a bobbin or a known direct spinning-drawing method can be employed.

According to a preferred procedure for the production of the filament used in the present invention, an undrawn yarn is drawn at a temperature of 110 to 200° C. to at least 40% of the maximum draw ratio under this condition, and then drawn at 160–260° C. and at a temperature above the drawing temperature in the preceding step to at least 90% of the maximum draw ratio under this condition. In this way, a filament of an ethylene naphthalene-2,6-dicarboxylate polyester having the above-described Z and B values can be obtained. Preferably, the filament used in the present invention has 1–30 denier, especially 3–15 denier per monofilament.

The filament is used in a known manner as a rubber reinforcing structure in the form of cords, cord fabric or duck.

The reinforcing structure is embedded in rubber by a known method to form reinforced rubber articles. For bonding rubber with the filament of an ethylene naphthalene-2,6-dicarboxylate polyester, the filament or other fibrous reinforcing structure is coated with an adhesive agent such as a combination of a known resorcinol-Formalin/rubber latex adhesive and an epoxy compound, an isocyanate compound or an ethyleneimine compound, a copolymer of a polyene compound, active hydrogen compound, and a polyisocyanate, or a copolymer of a polyester, polyene compound and a polyisocyanate, and after heat-treatment, the fibrous reinforcing structure is embedded in rubber, followed by vulcanization to form a rubber article. As the adhesive, the epoxy type adhesives are preferred since the isocyanate compounds and ethylene imine compounds are expensive and poisonous.

The term "rubber" used in the present specification and claims means rubbers usually used in the rubber industry, and includes natural rubber, synthetic rubber or compounded rubber, such as styrene-butadiene rubber, ethylene propylene rubber, ethylene propylene non-conjugated diene rubber, acrylonitrile butadiene rubber, cis-1,4-polybutadiene rubber, cis-1,4-polyisoprene rubber and neoprene. In the reinforced rubber article of the present invention, the reinforcing structure is inserted so that the filaments are arranged substantially in the direction in which the tensile force of the rubber article is exerted. For instance, the fibrous structure may be embedded in the rubber article in a number of patterns, such as straight lines, parallel lines, criss-cross, oblique stripes and radial lines.

Various compounding agents may be incorporated into rubber in accordance with known recipes. The vulcanization and fabrication of rubber may be performed by known means. Since the reinforcing structure of the present invention undergoes little shrinkage and deterioration on vulcanization, high temperatures and steam can be used in vulcanization. As the vulcanization accelerator, amines can be used with good results. There is no need to set up the special conditions such as in the vulcanization of polyethylene terephthalate described in British patent specification No. 1,106,920.

The invention will be described with reference to the accompanying drawings in which.

Figure 1:
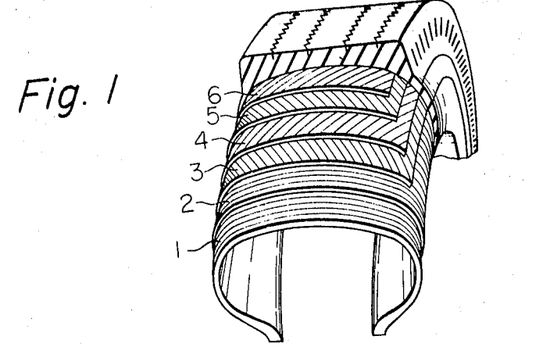
FIGS. 1 to 3 are a sketch, partly broken away, of the structure of a tyre according to the present invention.
Figure 2:
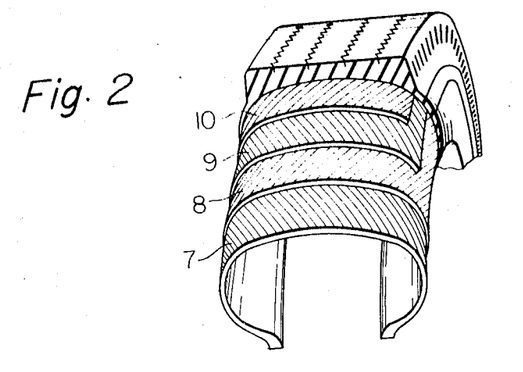
Figure 3:
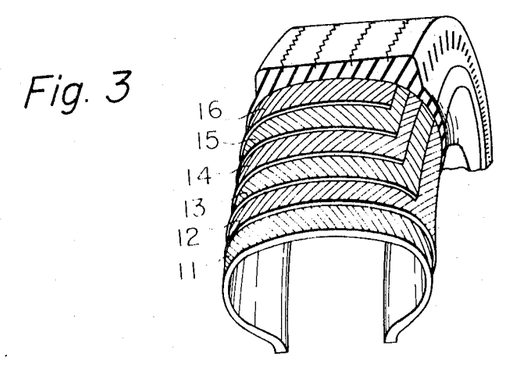

In the tyre of the present invention, the reinforcing structure of the ethylene naphthalene-2,6-dicarboxylate polyester filament having the above-described characteristics is embedded in the tread in a belt form. FIG. 1 shows a radial ply tyre having a 4-ply belt and a 2-ply carcass. The reference numerals 1 and 2 represent a carcass ply, and reference numerals 3, 4, 5 and 6, a belt ply consisting of a filament of an ethylene naphthalene-2,6-dicarboxylate polyester. In the belt plies 3, 4, 5 and 6, the filament is for instance arranged at an angle of 5 to 35° to the rotating direction of the tyre, and in every other ply, the arrangement of the filaments is the same as shown in FIGS. 1, 2 and 3. The filament is arranged in a radial fashion in the carcass plies 1 and 2. This filament may be composed of the above described ethylene naphthalene-2,6-dicarboxylate polyester or other filament consisting of high tenacity rayon, polyhexamethylene adipamide, polycaprolactam and polyethylene terephthalate.

The belted bias ply tyre shown in FIG. 2 and has a 2-ply carcass and a 2-ply belt. In the carcass plies 7 and 8, the filament is arranged at an angle of 30 to 45° to the radial direction of the filament, and the belt plies 9 and 10 have the same structure as shown in FIG. 1.

FIG. 3 shows the same belted bias ply tyre as shown in FIG. 2 except that it consists of two carcass plies 11 and 12 and four belt plies 13, 14, 15 and 16.

Figure 4:
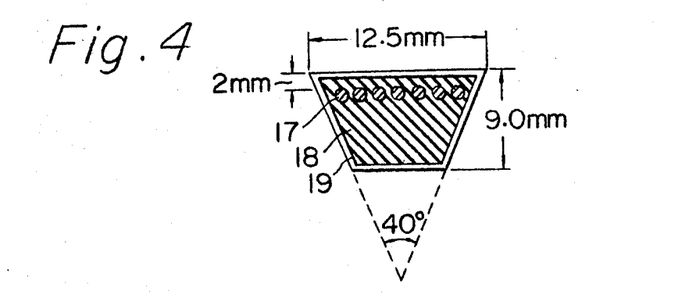
FIG. 4 is a cross sectional view showing the structure of V-belt according to the present invention.

FIG. 4 shows one example of a V-belt reinforced in accordance with the present invention, in which a cable cord 17 consisting of the ethylene naphthalene-2,6-dicarboxylate polyester of the present invention is embedded in a longitudinal direction in rubber 18 coated with a bottom cover cloth 19.

The rubber articles reinforced in accordance with the present invention are useful especially as tyres and belts for power transmission and conveying articles, but also have utility in the fields of water-proofed cloth requiring strength, rubber coated woven fabrics, hydraulic hoses, steam hoses, buffer rubber pads, and outer coatings of electric wires and cables.

The ethylene naphthalene-2,6-dicarboxylate polyester (PEN) filament used in the present invention has a far higher Young's modulus than the rayon and synthetic fibers now in general use, as shown in Table 1 below.

TABLE 1

Young's Modulus (kg./mm.$^2$) of Various Organic Fibers

| Ambient temperature | Filament | | | |
|---|---|---|---|---|
| | PEN | Rayon | PET | 6-nylon |
| Room temperature | 3,500 | 2,000 | 1,400 | 400 |
| 100° C | 2,300 | 1,500 | 950 | 200 |

NOTE.—PET = polyethylene terephthalate.

Figure 5:
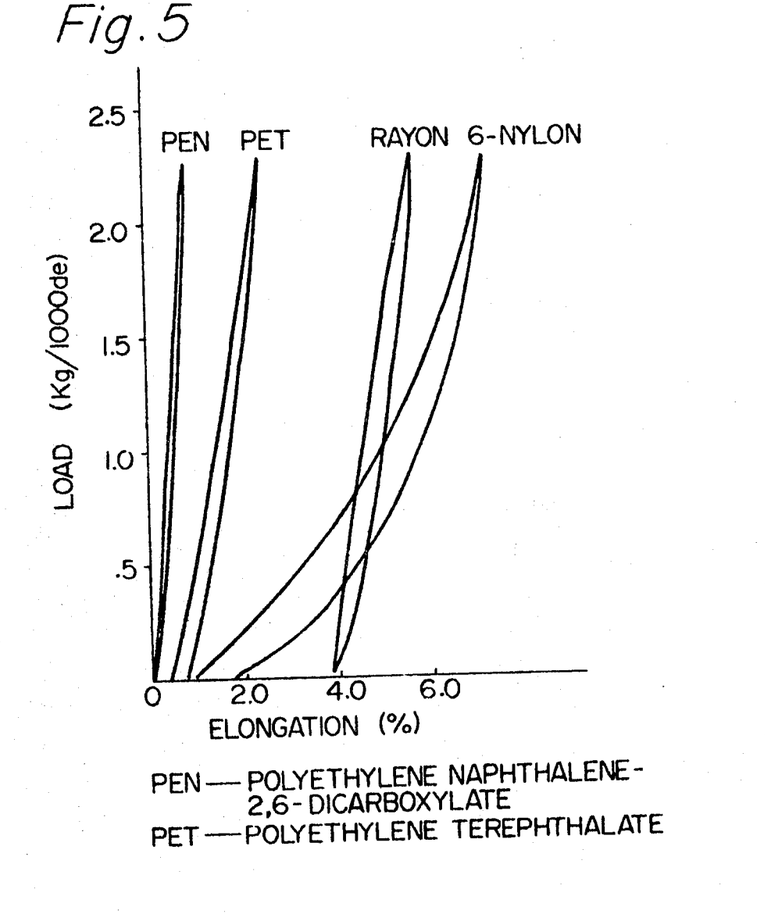
FIG. 5 is a diagram showing the hysteresis loss of various fibers.

As shown in FIG. 5, the PEN filament within the scope of the present invention has much lower hysteresis loss than other reinforcing fibers and has better dynamical characteristics at high temperatures to which the tyre is exposed during operation. The hysteresis loss shown in FIG. 5 was determined on an Instron tensile tester using a 20-cm. sample, an elongation rate of 100% per minute and a load of 2.3 kg./1000 de. exerted 20 times.

Table 2 shows that the poly(ethylene naphthalene-2,6-dicarboxylate) filament has a far better resistance to heat and to vulcanization than rayon and synthetic fibers such as nylon 6, nylon 66 and polyethylene terephthalate.

TABLE 2
Heat Resistance and Vulcanization Resistance of Various Organic Fiber Cords

|  | PEN | Rayon | PET | Nylon 6 |
|---|---|---|---|---|
| Resistance to heat | 94 | 0 | 70 | 90 |
| Resistance to vulcanization | 90 | 50 | 72 | 40 |

NOTES:
Resistance to heat is a tenacity retention (percent) of a sample after treating for 48 hours at 150° C. the sample sealed in an atmosphere having a relative humidity of 65%.
Resistance to vulcanization is a tenacity retention (percent) of a sample after treating for 10 minutes at 215° C. the sample fixed between plates of compounded rubber.

The invention will be further described by the following examples. In these examples, the composition of the adhesive, and the rubber recipes and vulcanization conditions were as follows:

RECIPE OF RUBBER FOR TYRES

|  | Parts | |
|---|---|---|
|  | Carcass | Tread |
| Rubber components: | | |
| Natural rubber | 80 | 80 |
| Styrene-butadiene rubber | 20 | |
| Cis-1,4-polybutadiene rubber | | 20 |
| High abrasion furnace | 5 | 50 |
| ZnO | 40 | 20 |
| Diphenyl guanidiene | 0.2 | |
| Dibenzothiazyl disulfide | 0.8 | |
| 2-mercapto benzothiazole | | |
| Styrene-phenol condensate | 1.0 | |
| Phenly-α-naphthylamine | | 1.0 |
| Stearic acid | 1.25 | 3.0 |
| Coumarone-indene resin | 0.25 | 2.5 |
| Pine tar | | 1.5 |
| Sulfur | 3.0 | 3.0 |
| CaCO₃ | 3.0 | |

VULCANIZATION OF TYRES

A green tyre fabricated as shown in FIGS. 1, 2 and 3 is vulcanized at 170° C. for 15 minutes at a pressure of 50 kg./cm.$^2$.

RECIPE OF RUBBER FOR BELTS

| | Parts |
|---|---|
| Natural rubber | 100 |
| High abrasion furnace | 50 |
| ZnO | 2.0 |
| 2-mercapto benzothiazole | 1.0 |
| Phenyl-α-naphthylamine | 1.0 |
| Stearic acid | 3.0 |
| Coumarone-indene resin | 0.25 |
| Pine tar | 1.5 |
| Sulfur | 3.0 |

These components are compounded and kneaded using a Banbury mixer, heated while kneading in an open roll, made into a sheet form by a sheeting roll, and cut to the desired length.

VULCANIZATION OF BELTS

The belt is vulcanized at 153° C. for 10 minutes in a steam autoclave at 10 kg./cm.$^2$.

BONDING CONDITIONS

Liquor composition: The following conditions were employed in accordance with the disclosure of Belgian patent 630,633 (Vereinigte Glanzstoff A.G.).

1st dip liquor for PET or PEN (liquor A)

| | Parts |
|---|---|
| Epicoat 812 (Shell Chemical Co.) | 50 |
| Dioctyl sodium sulfosuccinate | 7 |
| Piperidine | 6 |
| Hycar 2518 (41%) (Japanese Geon Company) | 60 |
| Water | 900 |

2nd dip liquor for PET or PEN or 1st dip liquor for nylon (liquor B)

| | Parts |
|---|---|
| Resorcinol | 14 |
| Formalin (35%) | 50 |
| NaOH (10%) | 7 |
| Natural rubber latex | 55 |
| Hycar 2518 (41%) | 330 |
| Water | 550 |

1st dip liquor for rayon (liquor C)

| | Parts |
|---|---|
| Resorcinol | 30 |
| Formalin (35%) | 40 |
| NaOH (10%) | 7 |
| Hycar 2518 (41%) | 120 |
| JSR-2108 (40%) (Japan Synthetic Rubber) | 500 |
| Water | 1000 |

Heat-setting conditions

Dipping was carried out under the following conditions using a dipping machine of Litzler Company.

| | PEN | PET | 6-nylon | Rayon |
|---|---|---|---|---|
| 1st heat-setting condition: | | | | |
| Temperature (° C.) | 220 | 220 | 150 | 210 | 150 |
| Time (minutes) | 4 | 4 | 1.5 | 0.5 | 3 |
| 2d heat-setting condition: | | | | |
| Temperature (° C.) | 210 | 210 | 200 | |
| Time (minutes) | 2 | 2 | 1 | |

The physical properties were measured in the following manner.

Tenacity and elongation

A sample is left to stand for one day at a relative humidity of 65% at 25° C. A 20 cm. sample is measured on an Instron tensile tester at an elongation rate of 100% per minute. The tenacity is calculated by dividing the tenacity at break by the denier of the sample before measurement, and the elongation is the elongation at break.

Young's modulus

A sample is left to stand for a day at a relative humidity of 65% at 25° C. A 20-cm. sample is measured on an Instron tensile tester at an elongation rate of 20% per minute. A ratio of stress to strain within the straight line part of the load-elongation curve up to 1% elongation is read and the Young's modulus is calculated from the ratio.

EXAMPLE A

An autoclave provided with a partial condenser was charged with 5,000 parts of 2,6-dimethyl naphthalate, 2,600 parts of ethylene glycol, 3.50 parts of calcium acetate monohydrate and 1.80 parts of antimony trioxide, and heated for 4 hours at 165–230° C. After driving off methanol, 0.840 part of phosphorous acid was added. The reaction mixture was transferred to a polymerization vessel, and heated gradually. It was reacted for 10 minutes at 260° C. at normal atmospheric pressure, for 40 minutes at 275° C. and 20 mm. Hg, and for 100 minutes at 290° C. and less than 0.5 mm. Hg thereby to form a prepolymer having an intrinsic viscosity of 0.55 and a terminal carboxyl content of 28 equivalents per million grams. At the end of the polymerization, the molten pre-polymer was immediately extruded and made into granular form. The granular prepolymer was heated for 3 hours at 190° C., and maintained for 8 hours at 245° C. in a dry nitrogen stream flowing at a rate of 200 ml./minute gram of the polymer. Poly(ethylene naphthalene-2,6-dicarboxylate) (designated as polymer No. 1) having an intrinsic viscosity of 0.80 was obtained.

EXAMPLE B

Polymers Nos. 4, 5, 6, 7, 10, 11 and 12 were produced in accordance with the process disclosed in U.S. patent specification No. 3,433,770. As the additive, diphenyl oxalate (DPO for short) was used, and added at a time designated and in an amount shown in Table 3 during the production of a prepolymer shown in Example A. After the addition of DPO, the reaction was conducted for several minutes at normal atmospheric pressure, and thereafter the pressure in the system was gradually reduced. Finally, the reaction was performed for 15 minutes under high vacuum below 0.5 mm. Hg thereby to form a polymer. The temperatures employed during polymerization under high vacuum and the reaction between the polymer and DPO were 290° C. for polymers Nos. 4, 5, 10, 11 and 12, and 280° C. for polymers Nos. 6 and 7.

Polymers Nos. 3, 8 and 9 were produced without using an additive. Polymers Nos. 3, 4, 5, 8, 9 and 12 are poly(ethylene 2,6-naphthalate); polymer No. 10 is poly(ethylene 2,6-naphthalate) having copolymerized therewith 1.0 mol percent of naphthalene-2,7-dicarboxylic acid based on the total acid component; polymer No. 11 is poly(ethylene 2,6-naphthalate) having copolymerized therewith 10.0 mol percent of naphthalene-2,7-dicarboxylic acid based on the total acid component, and polymers Nos. 6 and 7 are polyethylene terephthalate.

TABLE 3

| Polymer No. | Amount of DPO (mol percent based on the total acid component) | Time for reaction under high vacuum (min.) before adding DPO | Final polymer Intrinsic viscosity | Carboxyl group content (equivalents/$10^6$ g.) |
|---|---|---|---|---|
| 3 | | 200 | 0.75 | 41 |
| 4 | 0.8 | 75 | 0.69 | 11 |
| 5 | 0.5 | 120 | 0.85 | 21 |
| 6 | 0.3 | 160 | 1.02 | 35 |
| 7 | 1.0 | 140 | 1.12 | 12 |
| 8 | | 120 | 0.61 | 58 |
| 9 | | 60 | 0.43 | 21 |
| 10 | 0.5 | 85 | 0.70 | 25 |
| 11 | 0.5 | 90 | 0.69 | 29 |
| 12 | 1.2 | 60 | 0.66 | 6 |

EXAMPLE 1

Polymer No. 1 obtained in Example A was spun at a temperature of 330° C. at an extrusion rate of 56.0 g./minute using a spinneret having 56 holes with a diameter of 0.5 mm. and a length of 0.09 mm., and wound up at a rate of 250 meters per minute.

A heating chamber (50 cm. length) was provided below the spinneret and the temperature in the path of the yarn was adjusted to 350° C. The obtained undrawn yarn was drawn at the temperatures indicated below at a take-up speed of 100 meters per minute and at the ratio indicated in Table 4.

1st step: hot pin at 140° C.
2nd step: hot plate at 190° C.
3rd step: hot plate at 210° C.

TABLE 4

| Sample: | Draw ratio in— | | | Total draw ratio |
|---|---|---|---|---|
| | 1st step | 2d step | 3d step | |
| 1 | 4.72 | 1.39 | 1.00 | 6.53 |
| 2 | 4.78 | 1.39 | 1.06 | 6.96 |

The properties of the obtained yarns are shown in Table 5.

TABLE 5

| | Sample 1 | Sample 2 |
|---|---|---|
| Intrinsic viscosity | 0.66 | 0.66 |
| COOH content (eq./$10^6$ gm.) | 26 | 26 |
| Denier, de./56 fil. | 310 | 290 |
| Break strength (g./de.) | 8.48 | 9.06 |
| Break elongation (percent) | 5.3 | 4.8 |
| Young's modulus (kg./mm.$^2$) | 2,750 | 3,120 |
| An | 0.344 | 0.354 |
| S | 0.879 | 0.899 |
| Tm (° C.) | 283.4 | 286.6 |
| L (A.) | 65 | 65 |
| ρ | 1.3670 | 1.3615 |
| Z | 45 | 44 |
| B | 0.33 | 0.37 |

The yarn produced above was plied four ends, and two of the plied ends were then coded using S and Z twists (53 x 53). 2.0 g. each of the obtained codes and 1.0 ml. of water were sealed into a 20 ml. glass tube. The sealed tube was immersed for 4 hours in an oil bath at 150° C. and 180° C. respectively. Tenacity retentions of the codes were then determined with the results shown in Table 6. These codes were placed between two rubber boards prepared from the above-mentioned compounded rubber for carcass, and heat-treated for 25 minutes under a load of 50 kg./cm.$^2$ at 210° C. and 235° C. respectively. Tenacity retentions of the codes after heat deterioration are shown in Table 6.

TABLE 6

| Sample No. | Tenacity retention (percent) in the sealed tube | | Tenacity retention (percent) in rubber | |
|---|---|---|---|---|
| | 150° C. | 180° C. | 210° C. | 235° C. |
| 1 | 98.8 | 37.4 | 94 | 52 |
| 2 | 99.2 | 39.0 | 95 | 57 |

$$\text{Tenacity retention} = \frac{\text{tenacity after heat-treatment}}{\text{tenacity before heat-treatment}} \times 100 \text{ (percent)}$$

It is seen from these results that the reinforcing codes used in the present invention have a very small heat degradation under severe conditions and at high temperatures, and are far excellent in resistance to heat than a polyethylene terephthalate code to be shown in the subsequent comparative example.

COMPARATIVE EXAMPLE 1

Polyethylene terephthalate (PET for short) having an intrinsic viscosity of 1.05 and a terminal carboxyl group concentration of 22 eq./$10^6$ g. was prepared in accordance with the procedure described in Example A. This polymer was designated as polymer No. 2.

Polymer No. 2 was spun at a spinning temperature of 305° C. from a 56-hole spinneret at an extrusion rate of 56.0 g./min., and wound up at a rate of 250 meters per minute. A heating chamber (50 cm. length) was provided below the spinneret, and the temperature in the path of the yarn was adjusted to 350° C. The obtained undrawn yarn was drawn at a rate of 100 meters per minute under the conditions given in Table 7.

TABLE 7

| Sample No. | 1st step drawing | | 2d step drawing | | 3d step drawing | |
|---|---|---|---|---|---|---|
| | Drawing temperature (° C.) | Draw ratio | Drawing temperature (° C.) | Draw ratio | Drawing temperature (° C.) | Draw ratio |
| 3 | 102 | 4.31 | 150 | 1.48 | 225 | 1.00 |
| 4 | 102 | 4.31 | 150 | 1.48 | 225 | 1.00 |

Sample No. 4 was further maintained for three days in a 0.6% ether solution of diazomethane. The properties of the obtained yarns were determined. Codes from the yarns having the same construction as those produced in Example 1 were subjected to heat degradation test in the same manner as in Example 1. The results are shown in Table 8.

TABLE 8

| Sample No. | Intrinsic viscosity | Carboxyl group content (eq./10⁶ g.) | Denier, de./56 fil. | Tenacity (8/de.) | Elongation (percent) | Young's modulus (kg./cm.²) | Tenacity retention in the sealed tube (percent) | | Tenacity retention in rubber (percent) | |
|---|---|---|---|---|---|---|---|---|---|---|
| | | | | | | | 150° C. | 180° C. | 210° C. | 235° C. |
| 3 | 0.97 | 26 | 315 | 9.21 | 15.6 | 1,600 | 45.0 | 0 | 86 | 26 |
| 4 | 0.97 | 12 | 315 | 9.18 | 15.7 | 1,530 | 64.2 | 16.1 | 87 | 28 |

The results shown in the table illustrate a remarkable deterioration of the polyethylene terephthalate codes under severe conditions at high temperatures.

EXAMPLE 2 AND COMPARATIVE EXAMPLE 2

Sample yarns were produced in the same manner as in Example 1 from polymers Nos. 3, 4, 5 and 8 obtained in Example B. Each of these yarns was coded in the same maner as in Example 1, and the obtained sample codes were allowed to stand for one day in an air bath at 20° C. and a relative humidity of 65%. 2.0 g. each of the samples was sealed into a 20 ml. glass tube, and the sealed tube was immersed for 48 hours in an oil bath at 150° C. Thereafter, each of the samples was taken out, and its tenacity retention was determined. The results are shown in Table 9.

TABLE 9

| | Polymer No. | Sample No. | Carboxyl group content (eq./10⁶ g.) | Instrinsic viscosity | Z value | B value | Tenacity before treatment (g./de.) | Tenacity retention (percent) |
|---|---|---|---|---|---|---|---|---|
| Example 2 | 3 | 5 | 50 | 0.70 | 45 | 0.33 | 8.64 | 83 |
| | 4 | 6 | 15 | 0.63 | 45 | 0.33 | 8.44 | 100 |
| | 5 | 7 | 26 | 0.78 | 47 | 0.31 | 9.04 | 92 |
| Comparative Example 2 | 8 | 10 | 70 | 0.55 | 42 | 0.45 | 7.41 | 70 |

It is seen from the results that the codes of poly(ethylene naphthalene-2,6-dicarboxylate) are more excellent as rubber reinforcing structures than the codes of poly(ethylene terephthalate).

COMPARATIVE EXAMPLE 3

Sample yarns were produced in the same manner as in Comparative Example 1 from polymers Nos 6 and 7 (polyethylene terephthalate) obtained in Example B. These yarns were each coded in the same manner as in Example 1, and the obtained sample codes were subjected to a heat degradation test under the same conditions as described in Example 2. The results are shown in Table 10. The codes were treated in accordance with the adhesion method for PEN described hereinabove, and embedded at intervals of 3 mm. in the above-described carcass compounded rubber. Vulcanization of the rubber was carried out for 50 minutes at 135° C. and 50 kg./cm.² to prepare test pieces for testing a cord-and-rubber adhesion. One end of the test piece was fixed, and a force required to peel off five cords from the test piece in a direction of 180° was determined at room temperature on an Instron tensile tester. The result was expressed as a cord-and-rubber adhesion (kg./5 cords), and shown in Table 10.

TABLE 10

| Polymer No. | Sample No. | Carboxyl group content (eq./10⁶ g.) | Intrinsic viscosity | Tenacity before treatment (g./de.) | Tenacity retention (g./de.) | Cord-and-rubber adhesion (kg./5 cords) |
|---|---|---|---|---|---|---|
| 6 | 8 | 40 | 0.95 | 9.18 | 62 | 12.9 |
| 7 | 9 | 15 | 1.05 | 9.45 | 85 | 5.6 |

The results in this table illustrate that with an increase in the carboxyl group content, the heat degradation of the polyethylene terephthalate cord becomes more remarkable, and the polyethylene terephthalate cord having a small carboxyl group content undergoes a relatively small degree of heat degradation but has a lowered adhesion with rubber.

COMPARATIVE EXAMPLE 4

Poly(ethylene naphthalene - 2,6 - dicarboxylate) having an intrinsic viscosity of 0.43 was spun at a spinning temperature of 300° C. from a spinneret having 50 holes with a diameter of 0.5 mm. and a length of 0.9 mm. at an extrusion rate of 56.0 g./min., and wound up at a rate of 250 meters per minute.

The region 50 cm. below the spinneret was maintained at a temperature of 350° C. The obtained undrawn yarn had an intrinsic viscosity of 0.40 and a carboxyl group content of 25 eq./10⁶ g. The undrawn yarn was drawn at a total draw ratio of 5.6 at a takeup rate of 100 meters per minute at 140° C. in the first step and 190° C. in the second step. The obtained yarn (Sample No. 11) was found to have a tenacity of 5.82 g./de., and elongation of 4.6%, a Z value of 39, and a B value of 0.50. Codes made from this yarn had insufficient tenacity, and were found to be unsuitable for reinforcing rubber articles.

EXAMPLE 3 AND COMPARATIVE EXAMPLE 5

Each of the polymers Nos. 10 and 11 obtained in Example B was spun at a spinning temperature of 315° C. with the other spinning conditions maintained the same as in Example 1. The undrawn yarn obtained from polymer No. 10 was drawn in three steps under the same conditions as in Example 1, and the undrawn yarn from polymer No. 11 was drawn in three steps at a temperature 10° C. lower than the drawing temperature employed in Example 1. The obtained yarn samples had the properties shown in Table 11.

TABLE 11

| | Polymer No. | Sample No. | Intrinsic viscosity | Carboxyl group content (eg./10⁶g.) | Total draw ratio | Z value | B value | Tenacity (g./de.) | Elongation (percent) |
|---|---|---|---|---|---|---|---|---|---|
| Example 3 | 10 | 12 | 0.64 | 30 | 7.0 | 47 | 0.35 | 8,87 | 5.4 |
| Comparative Examqle 4 | 11 | 13 | 0.62 | 35 | 5.8 | 35 | 0.70 | 6.10 | 6.5 |

The sample yarns were coded in the same manner as in Example 1, and the obtained codes were subjected to a heat degradation test in accordance with the procedure described in Example 1. The results are shown in Table 12.

TABLE 12

| Sample No. | Tenacity retention in the sealed tube (percent) 150° C. | Tenacity retention in the sealed tube (percent) 180° C. | Tenacity retention in rubber (percent) 210° C. | Tenacity retention in rubber (percent) 235° C |
|---|---|---|---|---|
| Example 3 | 12 | 95.6 | 33.6 | 91 | 48 |
| Comparative Ex. 5 | 13 | 55.0 | 18.6 | 85 | 12 |

It is seen from the results shown in Table 12 that the cord from polymer No. 11 (containing 10.0 mol percent of naphthalene-2,7-dicarboxylic acid as the copolymer component) is heat degraded to a great degree and is unsuitable as a rubber reinforcing structure.

EXAMPLE 4 AND COMPARATIVE EXAMPLE 6

Polymer No. 12 obtained in Example B was spun at a spinning temperature of 315° C. with other conditions maintained the same as in Example 1, and drawn under the same conditions as in Example 1 at a total draw ratio of 6.60. The obtained yarn was coded in the same manner as in Example 1, and the obtained code was designated as sample No. 14.

Sample No. 14 was subjected to a cord-and-rubber adhesion test using the adhesive liquor (liquors A and B) containing an epoxy compound and the compounded rubber for the carcass. Also, the sample was subjected to a heat degradation test under the same conditions as in Example 2. The results are shown in Table 13.

TABLE 13

| | Sample No. | Intrinsic viscosity | Carboxyl group content (eq./10⁶ g.) | Z value | B value | CRA (kg./5 cords) | Tenacity retention at 150° C. in the sealed tube (percent) |
|---|---|---|---|---|---|---|---|
| Example 4 | 5 | 0.67 | 50 | 45 | 0.33 | 13.4 | 83 |
|  | 1 | 0.66 | 26 | 44 | 0.33 | 9.4 | 91 |
| Comparative Example 6 | 14 | 0.60 | 10 | 45 | 0.33 | 4.0 | 99 |

EXAMPLE 5

Mercapto benzoimidazole, an antioxidant for rubber, and diphenyl guanidine, a vulcanization accelerator, were respectively deposited from a 3% acetone solution onto codes made from sample No. 2 (PEN) obtained in Example 1 and sample No. 3 (PET) obtained in Comparative Example 1. The so treated codes were embedded in the compounded rubber described hereinabove, followed by vulcanization for one hour at 150° C. and 50 kg./cm.² and for further 48 hours at 150° C. The tenacity retentions of the cords were determined in comparison with the blank code containing no antioxidant nor vulcanization accelerator. The results are given in Table 14.

TABLE 14.—TENACITY RETENTION (PERCENT)

| Sample No. | Blank | Mercaptobenzo-imidazole | Diphenyl guanidine |
|---|---|---|---|
| 2 (PEN) | 99.4 | 98.9 | 92.7 |
| 3 (PET) | 90.1 | 59.8 | 43.8 |

The results in the table show that the polyethylene terephthalate cord suffers from a remarkable decrease in tenacity, but the poly(ethylene naphthalene-2,6-dicarboxylate) cord is ideal as a rubber reinforcing material.

EXAMPLE 6 AND COMPARATIVE EXAMPLE 7

Poly(ethylene naphthalene-2,6-dicarboxylate) prepared in accordance with the procedure described in Example A was spun at a spinning temperature of 315° C. using a spinneret having 192 holes with a diameter of 0.5 mm. at an extrusion rate of 235 g./min., and then wound up at a rate of 300 meters per minute. A heating chamber (50 cm. length) was provided below the spinneret, and the temperature in the path of the yarn was adjusted to 350° C. The obtained undrawn yarn was drawn at a take-up speed of 75 meters per minute in three steps at the temperatures and draw ratios indicated below.

1st step: hot pin at 135° C.
2nd step: hot plate at 195° C.
3rd step: hot plate at 215° C.

TABLE 15

| | Sample No. | Draw ratio in 1st step | Draw ratio in 2d step | Draw ratio in 3d step | Total draw ratio |
|---|---|---|---|---|---|
| Example 6 | 17 | 4.85 | 1.39 | 1.06 | 7.13 |
|  | 18 | 6.00 | 1.10 | 1.06 | 7.00 |
| Comparative Ex. 7 | 19 | 3.90 | 1.39 | Zero | 5.42 |

The obtained yarns had the properties shown in Table 16.

TABLE 16

| Sample No. | Intrinsic viscosity | Carboxyl group content (eq./10⁶ g.) | De/192 filament | Tenacity (g./de.) | Elongation (%) | Z value | B value |
|---|---|---|---|---|---|---|---|
| 17 | 0.60 | 34 | 990 | 7.5 | 5.2 | 41 | 0.38 |
| 18 | 0.60 | 34 | 1,000 | 9.1 | 4.6 | 48 | 0.30 |
| 19 | 0.60 | 34 | 1,300 | 5.0 | 6.8 | 34 | 0.70 |

Thereafter, a radial tyre was built using a poly(ethylene naphthalene-2,6-dicarboxylate) filament made each from samples Nos. 17, 18 and 19 as a reinforcing belt, and a rayon cord as a carcass. The PEN cord used as the reinforcing belt was composed of two of the abovementioned yarns (28S x 28Z, T/10 cm.), and the belt contained 30 cords per 5 cm. with four plies. The rayon cord as the carcass was 1650 denier/2 (47S x 47Z, T/10 cm.), and the carcass contained 38 cords per 5 cm. with 2 plies. The size of the tyre was 165 SR 13.

The cords for the belt were arranged at an angle of about 15° against the peripheral direction, and the cords for the carcass were arranged at an angle of 90° to the peripheral direction. The properties of the obtained radial tyres are shown in Table 17.

TABLE 17

| Tyre No. | Sample No. | Z value | B value | Maximum speed (km./hr.) | Wear of the tread | Cornering power (kg.) |
|---|---|---|---|---|---|---|
| 1 | 17 | 41 | 0.38 | 240–250 | Slight | 125 |
| 2 | 18 | 48 | 0.30 | 250–260 | do | 130 |
| 3 | 19 | 34 | 0.70 | 200–210 | Considerable | 105 |

NOTE.—The maximum speed is a speed at which the rubber reinforcing material separates from the rubber at the shoulder part of the tyre.

The *cornering power* is a force (kg.) exerted on the tyre when a slip angle of the tyre becomes 2° during running at 80 km./hour with a pneumatic pressure of the tyre maintained at 1.7 kg./cm.² and under a load of 400 kg.

As is seen from Table 17, tyre No. 3 undergoes more wear at the tread than tyres Nos. 1 and 2, and is poor in the maximum speed and cornering power. Thus, cord sample No. 3 is unsuitable as a belt for use in building a tyre.

EXAMPLE 7 AND COMPARATIVE EXAMPLE 8

An undrawn yarn of poly(ethylene naphthalene-2,6-dicarboylate) having an intrinsic viscosity of 0.63 and a carboxyl group content of 36 equivalents/10⁶ grams was produced in the same manner as in Eample 6. This undrawn yarn was drawn to 7.1 times the original length while maintaining the temperatures of a feed roller, heated vapor and draw roller at 100° C., 305° C., and 210° C., respectively. The obtained yarn was found to have 1000 denier per 192 filaments, a tenacity of 9.28 g./de., an elongation of 4.5%, a Z value of 45, and a B value of 0.33. Tyres were built using the resulting yarn as a belt and commercially avialable rayon having a tenacity of 5.0 g./de. and an elongation of 13.0%, polyethylene terephthalate-2,6-dicarboxylate) is used as a belt material of a radial tyre.

EXAMPLE 8

The drawn yarn of poly(ethylene naphthalene-2,6-dicarboxylate) obtained in Example 7 was coded to make the codes shown in Table 20, which were used as a reinforcing material for the tread of belted bias tyres. Glass filaments were used as comparison. As a carcass reinforcing material, the rayon and polyethylene terephthalate yarns same as those used in Example 7 were used.

TABLE 20

| | | | Carcass | | | | | | | Tread | | | |
|---|---|---|---|---|---|---|---|---|---|---|---|---|---|
| | Tyre No. | Material | Denier per the specified number of filaments | Number of twists (T./10 cm.) | Bias angle in the peripheral direction of the tyre, degrees | Number of ends per plies 5 cm. | Number of plies | Material | Denier per the specified number of filaments | Number of twists (T./10 cm.) | Bias angle in the peripheral direction of the tyre, degrees | Number of ends and plies |
| Comparison | 8 | PET | 1,000/3 | 39/39 | 33 | 44 | 2 | Glass | 3,000/1 | 4 | 27 | 2 |
| Example 8 | 9 | PET | 1,000/3 | 39/39 | 33 | 44 | 2 | PEN | 2,000/2 | 28/28 | 27 | 4 |
| | 10 | Rayon | 1,650/2 | 47/47 | 33 | 43 | 2 | PEN | 2,000/2 | 28/28 | 27 | 4 |

These tyres were fitted to an automobile and the driving test was conducted. The test was conducted on a road 30% of which was paved, at a maximum speed of 120 km./hr. The pneumatic pressure of the tyres was 2.0 kg./cm². The glass fiber reinforcing material of tyre No. 8 was broken owing to fatigue after driving over an average distance of 40,000 km. There was a remarkable decrease in cornering power and the tread portion was drastically worn. On the other hand, deterioration in properties was not seen in tyre No. 9 after driving over an average distance of 60,000 km., and in tyre No. 10 after driving over an average distance of 50,000 km.

TABLE 18

| | | Carcass | | | | | Belt | | | |
|---|---|---|---|---|---|---|---|---|---|---|
| | Tyre No. | Material | Denier per the specified number of filaments | Plies | Twists | Ends per 5 cm. | Material | Denier per the specified number of filaments | Plies | Twists | Ends per 5 cm. |
| Comparative Example 8 | 4 | Rayon | 1,650/2 | 2 | 47 x 47 | 38 | Rayon | 1,650/3 | 4 | 29 x 29 | 30 |
| Example 7 | 5 | Rayon | 1,650/2 | 2 | 47 x 47 | 38 | PEN | 2,000/2 | 4 | 28 x 28 | 30 |
| | 6 | PET | 1,000/3 | 2 | 39 x 39 | 35 | PEN | 2,000/2 | 4 | 28 x 28 | 30 |
| | 7 | Nylon 6 | 1,260/2 | 2 | 39 x 39 | 33 | PEN | 2,000/2 | 4 | 28 x 28 | 30 | thalate having a tenacity of 8.6 g./de. and an elongation of 13.0% and nylon 6 having a tenacity of 9.4 g./de. and an elongation of 17.5% as a carcass. Tyre No. 4 is a comparison consisting of rayon both as the belt and carcass.

These radial tyres (165 SR13, carcass cord angle 90°, belt cord angle 15°) were found to have the properties shown in Table 19.

TABLE 19

| | Tyre No. | Maximum speed (km./hr.) | Cornering power (kg.) | Heat generated during driving at 220 km./hr. (° C.) |
|---|---|---|---|---|
| Comparative Ex. 8 | 4 | 220–230 | 116 | 65 |
| Example 7 | 5 | 250–260 | 130 | 60 |
| | 6 | 240–250 | 135 | 60 |
| | 7 | 230–240 | 130 | 70 |

NOTE.—The generated heat is expressed in terms of the temperature in degrees centigrade of the shoulder part of the tyre at a pneumatic pressure of 1.7 kg./cm.² under a load of 400 kg.

It is seen from the results shown in the table that a very excellent tyre can be built when poly(ethylene naph-

EXAMPLE 9

An undrawn yarn of poly(ethylene naphthalene-2,6-dicarboxylate) same as that obtained in Example 7 was drawn under the following conditions.

| | Drawing temperature (° C.) | Draw ratio |
|---|---|---|
| 1st step | 140 (pin) | 6.0 |
| 2nd step | 190 (plate) | 1.10 |
| 3rd step | 220 (plate) | 1.12 |
| Total | | 7.40 |

The so obtained drawn yarn had a denier of 950 per 192 filaments, a Z value of 47 and a B value of 0.35. Using this yarn and the same rayon and polyethylene terephthalate yarns as used in Example 8, the cords shown in Table 21 were produced. These cords were subjected to the above-described adhesion treatment, and embedded in a compounded rubber for a belt in the manner shown in FIG. 4. Vulcanization of rubber was conducted for 10 minutes at 153° C. to form V-belt. The operation test was conducted under a load of 50 kg. using a pulley having an outer diameter of 60 mm. rotated at 3600 r.p.m. The results are shown in Table 21.

TABLE 21

| Belt No. | Material | Denier per the specified number of filaments | Number of twists (T./10 cm.) Z x S | Belt tenacity (kg.) | Tenacity retention of belt (percent) after 72 hrs. | Growth (percent) after 24 hrs. driving [1] | Endurability (index) |
|---|---|---|---|---|---|---|---|
| 1 | PEN | 950/3/3 | 10 x 15 | 520 | 96 | 0.25 | 180 |
| 2 (comparison) | Rayon | 1,100/2/5 | 10 x 27 | 310 | 85 | 0.60 | 100 |
| 3 (comparison) | PET | 1,000/3/3 | 10 x 15 | 430 | 75 | 1.52 | 130 |

[1] Growth (percent) based on the initial length before running.

It is seen from the results shown in the table that the belt reinforced with PEN cords has very excellent properties as compared with other belts.

EXAMPLE 10

An undrawn yarn of poly(ethylene naphthalene-2,6-dicarboxylate) was drawn under the conditions shown in Table 22, and a yarn having a denier of 1000 per 192 filaments was obtained. The properties of the obtained yarns are shown in Table 22.

TABLE 22

| | Belt Number | | | | | |
|---|---|---|---|---|---|---|
| | 4 | 5 | 6 | 7 | 8 | 9 |
| 1st step drawing: | | | | | | |
| Temperature (° C.) | 130 | 140 | 140 | 140 | 140 | 140 |
| Ratio | 6.00 | 5.50 | 5.50 | 5.50 | 5.00 | 4.50 |
| 2d step drawing: | | | | | | |
| Temperature (° C.) | 200 | 175 | 175 | 175 | | |
| Ratio | 1.13 | 1.31 | 1.31 | 1.09 | | |
| 3d step drawing: | | | | | | |
| Temperature (° C.) | 220 | 180 | 240 | | | |
| Ratio | 1.07 | 1.00 | 0.93 | | | |
| 4th step drawing: | | | | | | |
| Temperature (° C.) | 230 | | | | | |
| Ratio | 1.05 | | | | | |
| Total draw ratio | 7.61 | 7.14 | 6.69 | 6.00 | 5.00 | 4.50 |
| Sonic orientation | 0.899 | 0.906 | 0.878 | 0.883 | 0.850 | 0.796 |
| Δn | 0.354 | 0.347 | 0.335 | 0.327 | 0.303 | 0.279 |
| Tm (° C.) | 286.5 | 284.5 | 282.9 | 280.0 | 277.2 | 275.1 |
| $\rho$ | 1.3680 | 1.3650 | 1.3630 | 1.3620 | 1.3580 | 1.3575 |
| L (A.) | 57 | 57 | 65 | 45 | 39 | 40 |
| Intrinsic viscosity | 0.63 | 0.63 | 0.62 | 0.61 | 0.60 | 0.60 |
| Carboxyl group concentration (eq./10⁶ g.) | 30 | 30 | 32 | 33 | 34 | 34 |
| Young's Modulus (kg./min.²) | 3,800 | 2,780 | 2,380 | 2,500 | 1,700 | 1,250 |
| Tenacity (g./de.) | 9.45 | 8.38 | 7.07 | 6.09 | 4.90 | 4.14 |
| Elongation (percent) | 3.9 | 5.7 | 11.0 | 7.8 | 19.0 | 26.1 |
| Z value | 47 | 47 | 42 | 42 | 35 | 29 |
| B value | 0.36 | 0.39 | 0.36 | 0.53 | 0.68 | 0.68 |

V-belts were produced using the cords made from these materials in the same manner as in Example 9. The obtained V-belts had the properties shown in Table 23. The construction of the cord was 1000 de./3/3, 10Z x 15S (T/10 cm.).

TABLE 23

| Belt No. | Z value | B value | Tenacity (kg.) | Tenacity retention (percent) after 72 hours | Growth (percent) after 24 hours driving | Endurability (index) |
|---|---|---|---|---|---|---|
| 4 | 47 | 0.36 | 550 | 97 | 0.20 | 200 |
| 5 | 47 | 0.39 | 520 | 94 | 0.24 | 165 |
| 6 | 42 | 0.36 | 500 | 91 | 0.40 | 140 |
| 7 | 42 | 0.53 | 480 | 85 | 0.55 | 100 |
| 8 | 35 | 0.68 | 430 | 65 | 1.40 | 80 |
| 9 | 29 | 0.68 | 410 | 70 | 0.95 | 95 |

It is seen from the results shown in Table 23 that belts Nos. 8 and 9 comprising PEN yarn cord having a Z value of less than 35 and a B value of more than 0.65 are insufficient in tenacity, undergo a large growth during driving and have a low durability. On the other hand, belts Nos. 4 to 7 comprising PEN having a large Z value and a small B value have a large dimensional stability and excellent durability, and these PEN cords are very excellent as belt reinforcing materials.

What is claimed is:

1. A rubber article reinforced with the filaments of a substantially linear polyester consisting essentially of ethylene naphthalene-2,6-dicarboxylate recurring units and having an intrinsic viscosity of at least 0.5 and a concentration of carboxyl groups of 15 to 60 equivalents per million grams of the polymer.

2. A rubber article according to claim 1 wherein said reinforcing filaments are embedded in a rubber article so that they are aligned substantially in a direction in which a tensile force on the rubber article is exerted.

3. A rubber article according to claim 1 wherein said filaments have a Z value defined below of at least 36

$$Z = 200\Delta n - 3.60S - 0.118\ Tm - 0.007\ (L-50)^2 + 0.134\ TmS - (20\pm1)$$

wherein

Δn is the birefringence of the filament,
S is its sonic orientation,
Tm is its melting point at a constant length in ° C., and
L is a crystal size (A.).

4. A rubber article according to claim 3 wherein said filaments have a B value defined below of not more than 0.65

$$B = \frac{1}{(\rho - 1.32)L}$$

wherein $\rho$ is the specific gravity of the filament, and L is its crystal size (A.).

5. A tyre in which a reinforcing fibrous structure is embedded in a belt form on the inside of the tread, said fibrous structure being constructed of the filaments of a substantially linear polyester consisting essentially of ethylene naphthalene-2,6-dicarboxylate recurring units and having an intrinsic viscosity of at least 0.5 and a concentration of carboxyl groups of 15 to 60 equivalents per million grams of the polymer, said filament having a Z value defined in claim 3 of not less than 40.

6. A tyre according to claim 5 wherein said filament has a B value as defined in claim 4 of not more than 0.65.

7. A belt in which a reinforcing fibrous structure is embedded in rubber so as to be aligned at least in a longitudinal direction of the belt, said fibrous structure being constructed of the filaments of a substantially linear polyester consisting essentially of ethylene naphthalene-2,6-dicarboxylate recurring units and having an intrinsic viscosity of at least 0.5 and a concentration of carboxyl groups of 15 to 60 equivalents per million grams of the polymer, said filament having a Z value defined in claim 3 of not less than 36.

8. A belt according to claim 7 wherein said filament has a B value as defined in claim 4 of not more than 0.65.

(References on following page)

References Cited

UNITED STATES PATENTS

| | | | |
|---|---|---|---|
| 2,850,420 | 9/1958 | Hacker | 161—144 X |
| 3,051,212 | 8/1962 | Daniels | 161—231 X |
| 3,244,213 | 4/1966 | McMannis | 152—354 |
| 3,293,223 | 12/1966 | Duling | 260—475 FR |
| 3,330,862 | 7/1967 | Borkowski et al. | 260—475 FR |
| 3,386,961 | 6/1968 | Wiener | 161—231 X |
| 3,433,770 | 3/1969 | Shima et al. | 260—75 |
| 3,475,381 | 10/1969 | Price et al. | 260—75 |
| 3,502,620 | 3/1970 | Caldwell | 161—231 X |
| 3,525,703 | 8/1970 | Iwami et al. | 161—231 X |

FOREIGN PATENTS

| | | | |
|---|---|---|---|
| 715,528 | 8/1965 | Canada | 161—144 |
| 1,074,204 | 6/1967 | Great Britain. | |
| 1,186,431 | 4/1970 | Great Britain | 161—231 X |
| 1,106,920 | 3/1968 | Great Britain. | |

ROBERT F. BURNETT, Primary Examiner

S. M. HOFFMAN, Assistant Examiner

U.S. Cl. X.R.

152—359; 74—232; 161—144, 231; 198—193; 260—75R